(12) United States Patent
Scheffler

(10) Patent No.: US 6,990,157 B2
(45) Date of Patent: Jan. 24, 2006

(54) ALL-DIGITAL FSK DEMODULATION WITH SELECTABLE DATA RATE AND ADJUSTABLE RESOLUTION

(75) Inventor: Bernd Scheffler, Munich (DE)

(73) Assignee: Texas Instruments Incorporated, Dallas, TX (US)

( * ) Notice: Subject to any disclaimer, the term of this patent is extended or adjusted under 35 U.S.C. 154(b) by 680 days.

(21) Appl. No.: 09/790,861

(22) Filed: Feb. 24, 2001

(65) Prior Publication Data

US 2002/0118774 A1 Aug. 29, 2002

(51) Int. Cl.
*H04L 27/14* (2006.01)

(52) U.S. Cl. ............... 375/334; 375/324; 375/328; 329/300; 329/303

(58) Field of Classification Search ............... 375/327, 375/328, 334, 272, 325, 324; 329/300, 301, 329/303, 302
See application file for complete search history.

(56) References Cited

U.S. PATENT DOCUMENTS 5,311,556 A * 5/1994 Baker .................. 375/334
5,684,837 A * 11/1997 Chen .................. 375/334

\* cited by examiner

*Primary Examiner*—Young T. Tse
*Assistant Examiner*—Edith Chang
(74) *Attorney, Agent, or Firm*—Ronald O. Neerings; Wade James Brady, III; Frederick J. Telecky, Jr.

(57) ABSTRACT

All-digital FSK demodulation can be accomplished by producing in response to a received IF signal digital information (22) indicative of a frequency of the IF signal. A symbol represented by the IF signal can then be determined (28, 44) in response to the digital information.

14 Claims, 2 Drawing Sheets

ALL-DIGITAL FSK DEMODULATION WITH SELECTABLE DATA RATE AND ADJUSTABLE RESOLUTION

FIELD OF THE INVENTION

The invention relates generally to demodulation in RF receivers and, more particularly, to FSK (frequency shift keying) demodulation.

BACKGROUND OF THE INVENTION

Conventional RF receivers utilize FSK demodulators of the type generally illustrated in FIG. 1. In the example of FIG. 1, the dashed line represents the IC chip boundary. Thus, as shown in FIG. 1, the conventional approach utilizes external components such as the external LC tank circuit found between IC inputs 33 and 34. The LC tank circuit is used as a delay circuit. Other external components include a low-pass filter amplifier/post-detection amplifier located between IC inputs 31 and 30. Such use of external components is clearly disadvantageous in terms of integration capability. Moreover, external components such as the external tank circuit can also be quite costly in terms of component expenses. For example, the external tank circuit typically requires relatively expensive high-Q components. Furthermore, component tolerance issues can further impede cost efficient production. As shown in FIG. 1. the FM/FSK demodulator receives as an input an IF2_IN signal at input 39, the output of the FM/FSK demodulator is provided external to the IC at output 32. A DATA_OUT signal that has been filtered and amplified is present at IC output 38.

DETAILED DESCRIPTION

Figure 1:
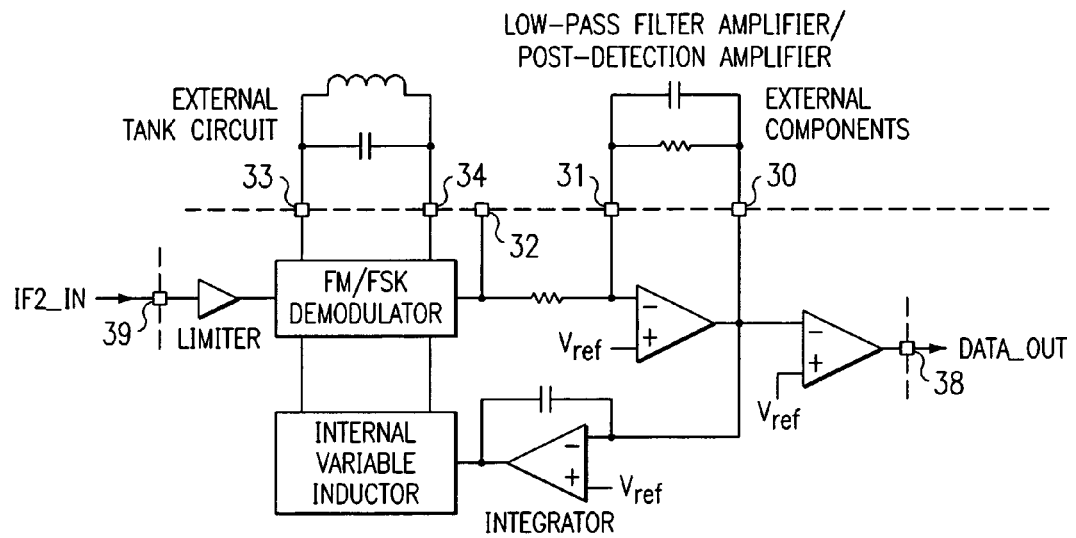
FIG. 1 diagrammatically illustrates pertinent portions of a conventional FSK demodulator.
Figure 2:
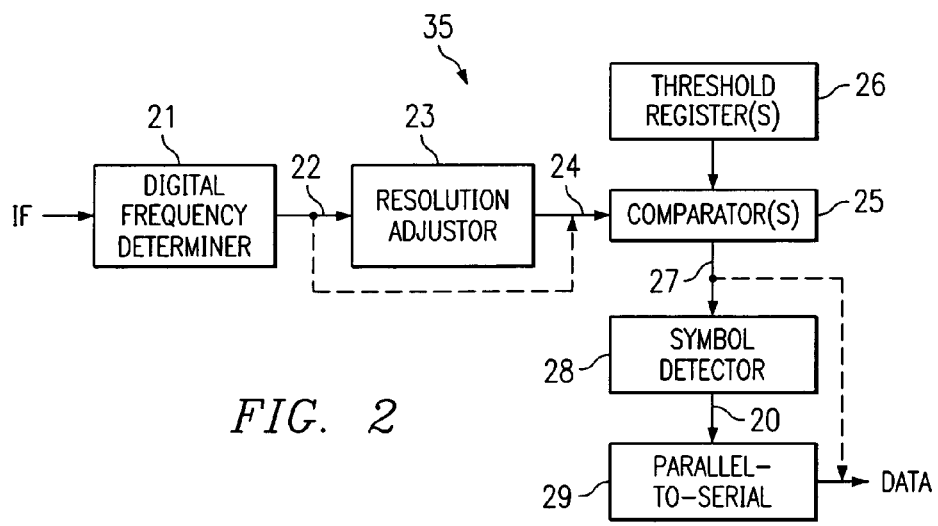
FIG. 2 diagrammatically illustrates pertinent portions of exemplary embodiments of an FSK demodulator according to the invention.

FIG. 2 diagrammatically illustrates pertinent portions of exemplary embodiments of an FSK demodulator according to the invention for use in an RF receiver. An input IF (intermediate frequency) signal, which has been converted into a square wave according to conventional practice, is applied to a digital frequency determiner 21. The digital frequency determiner 21 utilizes digital techniques to provide at output 22 digital information indicative of the frequency of the input IF signal. As shown by broken line in FIG. 2, this digital information at 22 can be applied at 24 directly to a digital symbol determiner 35 for determining symbols represented by the frequencies of the IF signal. The symbol determiner 35 includes one or more digital comparators 25 for respectively comparing the digital information at 24 to one or more threshold values stored in one or more threshold registers 26. The number of comparators and corresponding threshold values is dictated by the desired data rate. For example, and as will be discussed in more detail below, a data rate of one bit/symbol (normal FSK) requires one comparator and one threshold value, whereas a data rate of two bits/symbol (corresponding to 4FSK) requires three comparators and three corresponding threshold values.

For a one bit/symbol data rate (normal FSK), the comparator output 27 is the output data bit, as shown by broken line in FIG. 2. For higher data rates such as two bits/symbol, the respective outputs 27 of multiple comparators at 25 are applied to a symbol detector 28 which decodes the outputs to produce the data bits in parallel format at 20. The parallel formatted data bits are input to a parallel-to-serial converter 29 which provides the data bits in serial format.

In other embodiments, a resolution adjuster 23 can be coupled between the output 22 of the digital frequency determiner 21 and the input(s) 24 of the comparator(s) 25 of the symbol determiner 35. This resolution adjuster 23 can process over time the digital information produced at 22 in order to provide at 24 digital information which represents the IF frequency with more resolution than does the digital information at 22.

Figure 3:
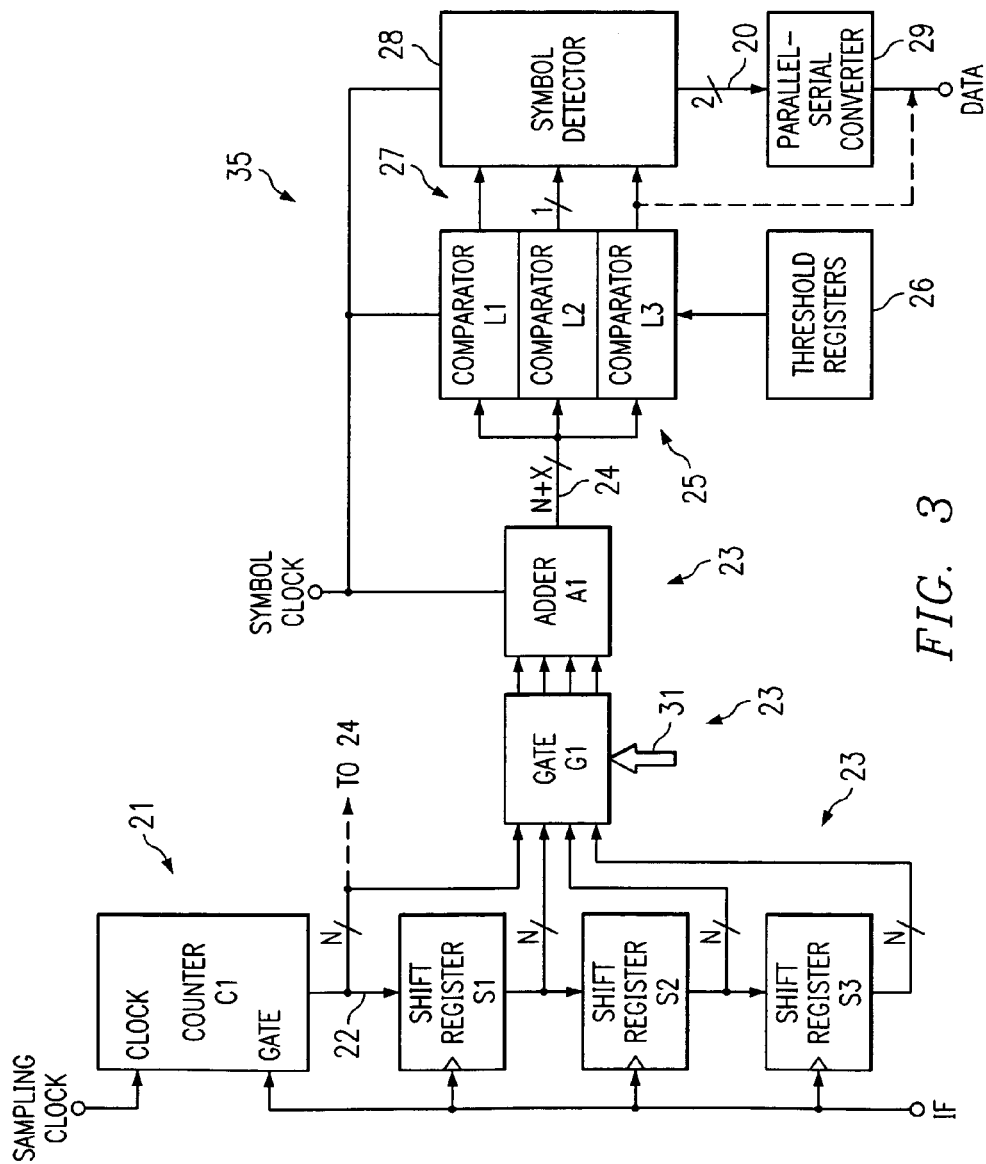
FIG. 3 diagrammatically illustrates portions of FIG. 2 in more detail.

FIG. 3 diagrammatically illustrates the embodiments of FIG. 2 in further detail, including exemplary embodiments of the digital frequency determiner 21 and the resolution adjuster 23 of FIG. 2. In FIG. 3, the digital frequency determiner 21 is embodied as a gated counter C1 having a clock (i.e., count) input for receiving a high frequency sampling clock and having a gate input for receiving the square wave IF signal. Also in FIG. 3, the resolution adjuster 23 includes a plurality of latches S1, S2 and S3 connected in series to provide a shift register. The outputs of the respective latches are coupled to the input of a gating circuit G1 which also receives the output 22 from the gated counter C1. The resolution adjuster 23 of FIG. 3 also includes an adder A1 coupled to the outputs of the gating circuit G1 for receiving and adding together selected ones of the gating circuit inputs which are passed to the gating circuit outputs in response to a selection control signal 31. The gating circuit can be, for example, any suitable parallel switching arrangement. The sum produced by the adder A1 can be provided to one or more comparators L1–L3 at 25.

Referring to the gated counter C1, when a rising edge appears at the gate input thereof, the current counter content (N bits total) is output at 22, and the previous counter content is simultaneously latched from output 22 into register S1. At the same time, the previous contents of the registers S1 and S2 are latched respectively into registers S2 and S3. Also at the time of a rising edge at the gate input of counter C1, the counter content is reset to 0, and the counter C1 begins again to count sampling clock cycles until the next IF rising edge appears at the gate input thereof.

The shift register arrangement at S1–S3 stores counter values from previous IF cycles, and selected ones of these counter values can be switched via gating circuit G1 and correspondingly accumulated by adder A1. The gate G1 can select any two or more of its inputs to be passed to the adder A1 for the summing operation. In this manner, a multiple number of IF cycles may be used to decide whether a logic 0 or a logic 1 was sent. This summing of current and previous count values advantageously increases resolution yet requires only a small portion of the demodulator to run at high frequency, namely the counter C1.

In the exemplary arrangement of FIG. 3, the adder A1 can add together as many as four counter values. The output 24 of adder A1 thus has N+X bits and, for the illustrated total of four available counter values, X=2. The value of X will of course increase as the size of the shift register arrangement (and thus the number of count values available for summing) increases.

In frequency shift keying, the possible deviations from a nominal IF frequency (2 IF frequency deviations for FSK, 4 IF frequency deviations for 4FSK, etc.) are known and, because the frequency of the sampling clock is known, the expected count value between consecutive rising edges of the IF square wave can be determined in advance. The threshold values within the threshold registers 26 can then be defined accordingly for use by the comparator section 25.

In FSK embodiments, there are two possible IF frequency deviations (e.g., the nominal IF frequency + or − a deviation amount), each of which has a corresponding expected count value which can be easily calculated in advance. The threshold value can then be set, for example, midway between the two expected count (or sum of count) values. Then, if the count value (or sum of count values) at 24 is determined by the comparator to be greater than the threshold value, this indicates a logic 1. Conversely, if the count value (or sum of values) at 24 is determined by the comparator to be less than the threshold value, this indicates a logic 0.

In 4FSK embodiments (with 2 bits/symbol), there are four possible IF frequency deviations (e.g., the nominal IF frequency + or − a deviation amount, and the nominal IF frequency + or − twice the deviation amount), so three comparators L1, L2 and L3 are necessary. Because each of the four possible IF frequency deviations has a corresponding expected count (or count sum) value, three threshold values can be set, for example, midway between the three adjacent pairs of the four expected count (or count sum) values. The comparators at 25 then compare the count (or count sum) value at 24 with the three threshold values to determine which of the four possible IF frequency deviations is represented by the digital value at 24. The results of the three comparisons are provided to the symbol detector 28, which decodes the comparator outputs to produce in parallel format the two bits of the symbol corresponding to the detected IF frequency deviation. These two bits are applied to the parallel-to-serial converter 29 as discussed above.

The above-described broken line embodiments of FIG. 2 are also illustrated by broken line in FIG. 3. Only one comparator (e.g. L3) and one threshold value (and register) are needed in normal FSK embodiments. If multiple comparators are provided (as in FIG. 3), together with multiple threshold registers and symbol detector 28 and parallel-to-serial converter 29, then both FSK and 4FSK operation can be readily supported.

The operations of the adder A1, the comparators at 25 and the symbol detector 28 are suitably synchronized by the RF receiver's symbol clock, which can be generated in conventional fashion.

Figure 4:
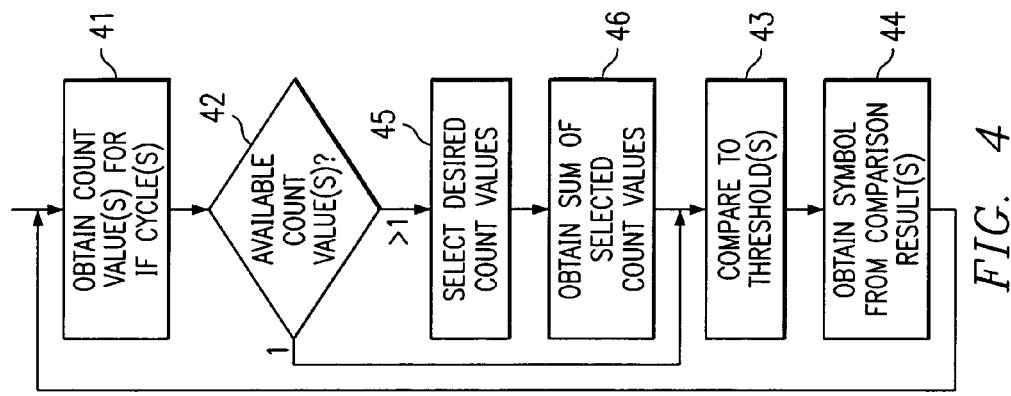
FIG. 4 illustrates exemplary operations which can be performed by the embodiments of FIGS. 2 and 3.

FIG. 4 illustrates exemplary operations which can be performed by the FSK demodulator embodiments of FIGS. 2 and 3. After obtaining at 41 the count value(s) for the IF cycle(s), the number of available count values is determined at 42. If there is only one available count value, then this count value is compared at 43 to a threshold value (for FSK) or a plurality of threshold values (e.g., for 4FSK). Thereafter at 44, the symbol is obtained from the result(s) of the comparison(s) at 43. After the symbol has been obtained at 44, the next count value(s) can be awaited at 41.

If there is more than one available count value at 42, then the desired count values are selected at 45, and the sum of the selected count values is obtained at 46. Thereafter at 43, the count value sum is compared to one or more threshold values. At 44, a symbol is obtained from the result(s) of the comparison(s) at 43.

As demonstrated above, FSK demodulation according to the invention provides advantages over the prior art, including these examples: reduction in size due to decreased external component count and correspondingly increased levels of integration; price reduction due to elimination of expensive high-Q components; cost efficient production and easy design-in due to elimination of component tolerance issues; no need for DC offset calibration during reception, resulting in faster settling and shorter training sequences; and easy implementation of higher data rates such as 4FSK.

It will be evident to workers in the art that the embodiments described above can be implemented by suitable digital signal processing circuitry, using software, hardware or a combination of software and hardware.

Although exemplary embodiments of the invention are described above in detail, this does not limit the scope of the invention, which can be practiced in a variety of embodiments.

What is claimed is:

1. A digital FSK demodulation apparatus, comprising:
    a first input for receiving an IF signal;
    a digital frequency determiner coupled to said first input for producing digital information indicative of a frequency of said IF signal in response to said IF signal;
    a digital symbol determiner coupled to said digital frequency determiner and responsive to said digital information for determining a symbol represented by said frequency of said IF signal; and
    a resolution adjuster coupled between said digital frequency determiner and said digital symbol determiner for processing said digital information over time to produce time-processed digital information, said digital symbol determiner responsive to said time-processed digital information for determining said symbol;
    wherein the resolution adjuster includes a latch coupled to said digital frequency determiner for respectively maintaining a previous instance of said digital information;
    an adder coupled to said digital symbol determiner and said latch for adding said digital information to said previous instance of said digital information to produce said time-processed digital information, and
    a gating circuit having an input coupled to said latch and having an output coupled to said adder for gating to said adder selected ones of said digital information and said previous instance of said digital information.

2. The apparatus of claim 1, wherein said digital frequency determiner includes a counter having a count input for receiving a clock signal and having a gate input coupled to said first input for receiving said IF signal, said counter responsive to said count input and said gate input for counting a number of cycles of said clock signal that occur during a cycle of said IF signal, and wherein said digital information is said number of cycles.

3. The apparatus of claim 2, wherein said digital symbol determiner includes a digital comparator for comparing said number of cycles to a predetermined value to produce a comparison result.

4. The apparatus of claim 2, wherein said digital symbol determiner includes a plurality of digital comparators for comparing said number of cycles respectively to a plurality of predetermined values to produce a corresponding plurality of comparison results.

5. The apparatus of claim 4, wherein said digital symbol determiner further includes a symbol detector coupled to said plurality of digital comparators for decoding said plurality of comparison results to produce said symbol.

6. A digital FSK demodulation apparatus, comprising:
a first input for receiving an IF signal;
a digital frequency determiner coupled to said first input for producing digital information indicative of a frequency of said IF signal in response to said IF signal;
a digital symbol determiner coupled to said digital frequency determiner and responsive to said digital information for determining a symbol represented by said frequency of said IF signal; and
a resolution adjuster coupled between said digital frequency determiner and said digital symbol determiner for processing said digital information over time to produce time-processed digital information, said digital symbol determiner responsive to said time-processed digital information for determining said symbol;
wherein the resolution adjuster includes a plurality of latches coupled to said digital frequency determiner for respectively maintaining a plurality of previous instances of said digital information;
an adder coupled to said digital symbol determiner and said plurality of latches for adding said digital information to said previous instances of said digital information to produce said time-processed digital information; and
a gating circuit having an input coupled to said plurality of latches and having an output coupled to said adder for gating to said adder selected ones of said digital information and said previous instances of said digital information.

7. The apparatus of claim 6, wherein said digital frequency determiner includes a counter having a count input for receiving a clock signal and having a gate input coupled to said first input for receiving said IF signal, said counter responsive to said count input and said gate input for counting a number of cycles of said clock signal that occur during a cycle of said IF signal, and wherein said digital information is said number of cycles.

8. The apparatus of claim 6, wherein said digital symbol determiner includes a digital comparator coupled to said resolution adjuster for comparing said time-processed digital information to a predetermined value to produce a comparison result.

9. A digital FSK demodulation apparatus, comprising:
an input for receiving an IF signal;
a digital frequency determiner coupled to said input for producing in response to said IF signal digital information indicative of a frequency of said IF signal;
a digital symbol determiner coupled to said digital frequency determiner and responsive to said digital information for determining a symbol represented by said frequency of said IF signal; and
a resolution adjuster coupled between said digital frequency determiner and said digital symbol determiner for processing said digital information over time to produce time-processed digital information, said digital symbol determiner responsive to said time-processed digital information for determining said symbol;
wherein said digital symbol determiner includes a plurality of digital comparators coupled to said resolution adjuster for comparing said time-processed digital information respectively to a plurality of predetermined values to produce a corresponding plurality of comparison results, said digital symbol determiner further includes a symbol detector coupled to said plurality of digital comparators for decoding said plurality of comparison results to produce said symbol.

10. A digital FSK demodulation method, comprising:
receiving an IF signal;
producing in response to said IF signal digital information indicative of a frequency of said IF signal;
in response to said digital information, determining a symbol represented by said frequency of said IF signal; and
processing said digital information over time to produce time-processed digital information, said determining step including determining said symbol based on said time-processed digital information;
wherein said determining includes comparing said time-processed digital information to a plurality of predetermined values to produce a corresponding plurality of comparison results, and decoding said plurality of comparison results to produce said symbol.

11. The method of claim 10, wherein said producing step includes counting a number of cycles of a clock signal that occur during a cycle of said IF signal, and wherein said digital information is said number of cycles.

12. The method of claim 10, wherein said processing includes adding said digital information to previous instance of said digital information to produce said time-processed digital information.

13. The method of claim 10, wherein said processing includes maintaining a plurality of previous instances of said digital information, an adding step including adding together selected ones of said digital information and said previous instances of said digital information to produce said time-processed digital information.

14. The method of claim 10, wherein said producing includes counting a number of cycles of a clock signal that occur during a cycle of said IF signal, and wherein said digital information is said number of cycles.

* * * * *